United States Patent [19]

Inaba et al.

[11] 4,099,111
[45] Jul. 4, 1978

[54] CONTROL APPARATUS FOR DC MOTOR

[75] Inventors: Hiromi Inaba, Hitachi; Seiya Shima, Katsuta; Korefumi Tashiro, Hitachi; Takeki Ando, Nakamachi, all of Japan

[73] Assignee: Hitachi, Ltd., Japan

[21] Appl. No.: 710,162

[22] Filed: Jul. 30, 1976

[30] Foreign Application Priority Data

Aug. 8, 1975 [JP] Japan .................................. 50-95765

[51] Int. Cl.² .............................................. H02P 7/14
[52] U.S. Cl. .................................. 318/338; 318/332; 318/493
[58] Field of Search ............... 318/338, 332, 493, 327, 318/432

[56] References Cited

U.S. PATENT DOCUMENTS

| | | | |
|---|---|---|---|
| 3,735,226 | 5/1973 | Pittner | 318/338 |
| 4,019,107 | 4/1977 | Dixon et al. | 318/338 |

*Primary Examiner*—David Smith, Jr.
*Attorney, Agent, or Firm*—Craig & Antonelli

[57] ABSTRACT

In order to control a DC motor, a main circuit is constructed in such a manner that a unidirectional thyristor converter is connected to the armature of the motor, while a bilateral thyristor converter is connected to the field system of the motor. Provided is a speed controller which is impressed with a speed command signal and a speed feedback signal so that the speed controller produces an error signal representing the difference between the speed command signal and the speed feedback signal and the error signal is applied to a function generator which in turn produces a field current command signal and an armature current command signal. The field current command signal assumes a value proportional to the error signal when the error signal is less than a predetermined value. The armature current command signal is kept constant when the error signal is below a predetermined value, while it increases, when the error signal exceeds the predetermined value, in proportion to the amount of the excess. These current command signals are used to phase-control the thyristor converters in the field circuit and the armature circuit.

14 Claims, 10 Drawing Figures

CONTROL APPARATUS FOR DC MOTOR

BACKGROUND OF THE INVENTION

1. Field of the Invention

This invention relates to a control apparatus for a DC motor, or more in particular to a control apparatus suitable for applications such as an elevator requiring an accurate speed control.

Most DC motors for driving elevator cars are controlled by the Ward-Leonard system. The static Leonard system employing a thyristor converter has long been used as a practical means for control of the DC motor for the rolling mill. In recent years, this static Leonard system has found applications or has been tested for practical applications in the field of the elevator.

There are two types of the static Leonard system. One is a system in which a bilateral thyristor converter is connected to the armature while a unidirectional thyristor converter is connected to the field system. The other static Leonard system is such that a unidirectional thyristor converter is connected to the armature whereas a bilateral thyristor converter is connected to the field system.

This invention relates to an improvement in the motor control apparatus of the latter type.

2. Description of the Prior Art

Not only such a load as an elevator car but also other loads, which are driven by an electric motor, require a large torque for acceleration or deceleration. Since the acceleration or deceleration period is short, however, it is possible to cause the motor to operate above its rating for such a period. In fact, the motor for the elevator car is so controlled that 200 to 300% of armature current flows as required during the acceleration or deceleration.

In the case where a unidirectional thyristor converter is connected to the armature to permit unidirectional current flow while connecting a bilateral thyristor converter to the field system to allow current flow in both directions for the control of a DC motor, it is well known to control both the armature current and the field current at the same time in accordance with a torque command representing a speed error. To control simultaneously the armature current and the field current which are both probable causes of an external disturbance, however, is undesirable in view of the resulting non-linearity of the torque generation characteristics of the DC motor with respect to the torque command.

On the other hand, a method obviating this disadvantage is also well known in which the armature current is controlled at a fixed level which is different for acceleration/decleration and for the other periods, so that the torque generation is controlled by varying the field current, as is disclosed in detail in U.S. Pat. No. 3,811,079 entitled "DC Motor Control System", patented May, 14, 1974 based on application, Ser. No. 354,459, filed Apr. 25, 1973 in the name of Korefumi Tashiro et al and assigned to the same assignee as the present invention. In this control apparatus, a large torque is not always required for acceleration or deceleration. In spite of this, an armature current as large as twice or thrice the rating is made to flow over the entire period of acceleration or deceleration, thus posing a problem of heat being generated in the motor. Also, during the transient period from steady run to decelera-tion, the difference between the rise time of the armature current and the time of change in the field current results in the disadvantage that the motor is undesirably accelerated temporarily. Further, in a stage during the transfer from accelerated or decelerated state to the steady run, the armature current and the field current unavoidably undergo a change, thus making it impossible to completely eliminate the non-linearity of the torque characteristics mentioned above.

SUMMARY OF THE INVENTION

Accordingly, it is an object of the present invention to provide a control apparatus for a DC motor, which is capable of minimizing heat generation in the DC motor.

Another object of the invention is to provide a control apparatus for a DC motor, which is high in the controllability of the motor torque in response to a torque command given in most cases in accordance with a speed error.

According to one aspect of the invention, in a control apparatus in which a unidirectional converter allowing current flow only in one direction is connected to the armature of a DC motor, and a bilateral converter allowing current flow in both directions is connected to the field system, so that the armature current and the field current are controlled in accordance with a given torque command, when the torque command is below a predetermined value the field current is varied in accordance with the torque command with the armature current maintained to be constant, and when the torque command exceeds the predetermined value, on the other hand, the field current is fixed while increasing the armature current in proportion to the amount of the excess of the torque command over the predetermined value.

DESCRIPTION OF THE PREFERRED EMBODIMENTS

Figure 1:
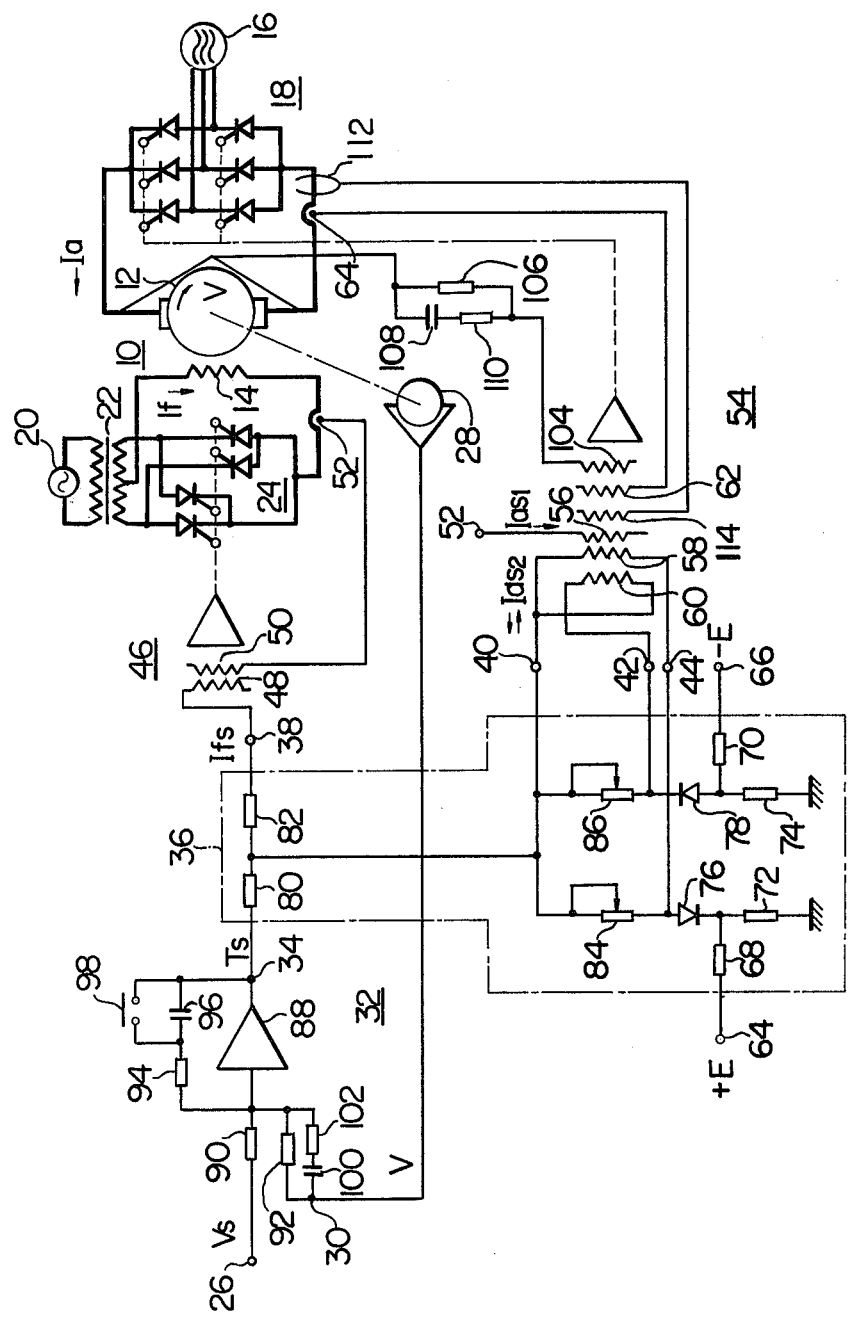
FIG. 1 is a general circuit diagram showing a preferred embodiment of a control apparatus for a DC motor according to the present invention.

In FIG. 1, a DC motor 10 includes an armature 12 and a field winding 14. Current is supplied to the armature 12 only in one direction through a unidirectional thyristor converter 18 connected to an AC power supply 16. The field winding 14, on the other hand, is supplied with current in both directions through a bilateral thyristor converter 24 which in turn is connected via a transformer 22 to an AC power supply 20. These component parts make up a main motor circuit defined by the thick solid lines. Next, a speed control apparatus will be described below.

A speed command signal voltage is applied to a terminal 26, while an output voltage of a tachogenerator 28 is applied to a terminal 30. These voltages are compared with each other by a pre-amplifier 32, so that a voltage proportional to the speed error, namely a torque command voltage Ts, is produced at an output terminal 34. The torque command voltage Ts is applied to a function generator 36, whose first output is applied to a terminal 38 and a second output to terminals 40, 42 and 44. The first output constitutes a field current command $I_{fs}$ while the second output makes up an armature current increment command $I_{as2}$.

A magnetic phase shifter 46 utilizing a magnetic amplifier has two control windings 48 and 50 which are impressed with the field current command $I_{fs}$ and the output of a field current detector 52 respectively. Thus the phase shifter 46 is capable of controlling the firing of the bilateral thyristor converter 24 in such a manner as to reduce the error between the field current command $I_{fs}$ and the actual field current $I_f$.

A constant armature current command $I_{as1}$ is applied to a terminal 52. This armature current command $I_{as1}$ is further applied to a first control winding 56 of a magnetic phase shifter 54, while the armature current increment command $I_{as2}$ is applied to a second control winding 58 and a third control winding 60. The output of an armature current detector 64 is negatively fed back to a fourth control winding 62 of the magnetic phase shifter 54. In this way, the magnetic phase shifter 54 is capable of phase-controlling the unidirectional thyristor converter 18 in such a manner as to eliminate the error between the armature current command $I_{as}$ ($= I_{as1} + I_{as2}$) and the actual armature current $I_a$.

Explanation will be made now of the function generator 36 which makes up an essential part of the invention. In the example shown, the function generator 36 includes the input terminal 34 impressed with the torque command Ts, the first output terminal 38 for producing the field current command $I_{fs}$ and the second output terminals 40, 42 and 44 for producing the armature current increment command $I_{as2}$. This function generator 36 may be divided into first and second function generator units.

Figure 2:
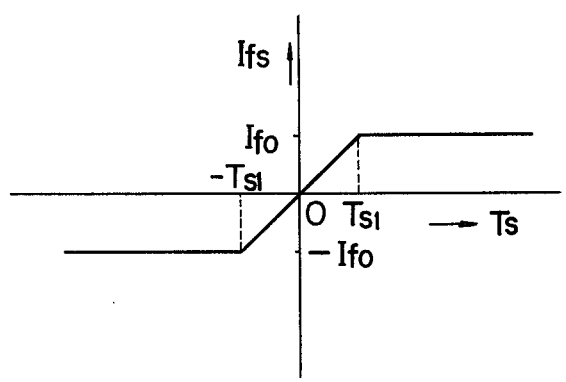
FIG. 2 is a diagram showing the field current command characteristics with respect to the torque command.

The characteristics of the first function generator unit are shown in FIG. 2, where the abscissa represents torque command Ts and the ordinate field current command $I_{fs}$. In the range from $-T_{s1}$ to 0 to $T_{s1}$, the field current command $I_{fs}$ is proportional to the torque command $T_s$, while in the other range the field current command $I_{fs}$ is maintained at the fixed value $I_{f0}$ or $-I_{f0}$. It will thus be seen that the first function generator unit makes up a control circuit.

Figure 3:
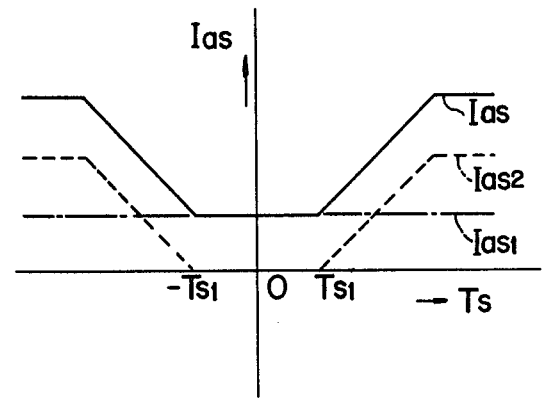
FIG. 3 is a diagram showing the armature current command characteristics with respect to the torque command.

The characteristics of the second function generator unit are shown in FIG. 3, where the abscissa and ordinate represent the torque command $T_s$ and the armature current command $I_{as}$ respectively. In the range of torque command $T_s$ from $-T_{s1}$ to 0 to $T_{s1}$, the armature current increment command $I_{as2}$ shown by a dashed line is zero. When the torque command $T_s$ exceeds $T_{s1}$ or $-T_{s1}$, the increment command $I_{as2}$ increases in one direction in proportion to the amount of the excess. When the torque command $T_s$ further increases in the positive or negative direction, the increment command $I_{as2}$ finally reaches a saturation point, which is a phenomenon not necessarily required. The armature current command $I_{as1}$, on the other hand, is held at a fixed value as shown by a one-dot chain. As a result, the total armature current command $I_{as}$ ($= I_{as1} + I_{as2}$) may assume the characteristics as shown by a solid line. In other words, the second function generator unit includes an absolute value circuit impressed with the torque command and an insensitive element impressed with the output of the absolute value circuit.

This operation will be explained with reference to a specific circuit of the function generator 36 shown in FIG. 1. Voltages $+E$ and $-E$ corresponding to $I_{f0}$ and $-I_{f0}$ are applied to the terminals 64 and 66 respectively. These voltages are further applied across resistors 72 and 74 respectively via resistors 68 and 70. Reference numerals 76 and 78 show diodes, numerals 80 and 82 resistors, and numerals 84 and 86 adjustable high-value resistors.

Assuming that the torque command $T_s$ is smaller than the absolute value of the voltage across a resistor 72 or 74, the field current command $I_{fs}$ is equal to $T_s$. In other words, the characteristics in the range from $-T_{s1}$ to 0 to $+T_{s1}$ are obtained. Under this condition, no current is allowed to flow in the control winding 58 or 60 of the magnetic phase shifter 54, so that the armature current increment command $I_{as2}$ is zero. As a result, the characteristics in the range from $-T_{s1}$ to 0 to $+T_{s1}$ in FIG. 3 are obtained.

In the range other than $-T_{s1}$ to $+T_{s1}$, current flows through the terminal 34, the resistor 80, the control winding 58, the diode 76, the resistor 72 and the earth in that order when the torque command $T_s$ is in the positive direction; while current flows through the earth, the resistor 74, the diode 78, the control winding 60, the resistor 80 and the terminal 34 in that order when the torque command $T_s$ is negative. As a result, the field command $I_{fs}$ is prevented from increasing and held at the constant value $I_{f0}$ or $-I_{f0}$ respectively. At the same time, the current proportional to the amount of excess of the absolute value of the torque command $T_s$ over the predetermined value $T_{s1}$ flows in the control wingings 58 and 60.

Thus, the field current command $I_{fs}$ and the armature current command $I_{as}$ may be given as shown by the solid lines in FIGS. 2 and 3.

The operation of the apparatus as a whole which results from the application of a torque command $T_s$ of certain magnitude to the function generator 36 will be explained below with reference to FIG. 4.

(1) When the torque command $T_s$ belongs to the operation section I requiring a comparatively low torque:

Since the field current command $I_{fs}$ assumes a value corresponding to less than the limit value $I_{f0}$, the field current command $I_{fs}$ is applied to the phase shifter 46 in accordance with the torque command $T_s$. Therefore, the field current $I_f$ is variable between positive and negative.

Further, the armature current command $I_{as}$ is maintained constant irrespective of the torque command $T_s$, so that the armature current $I_a$ is subjected to control at a fixed value.

In other words, the field current is changed to control the torque with the armature current held at a fixed value in the operation section I.

(2) When the torque command $T_s$ belongs to the operation section II:

Since the field current command $I_{fs}$ is controlled to be constant at the limit value $I_{f0}$, the field current $I_f$ is also controlled at a positive limit value.

(3) When the torque command $T_s$ belongs to the operation section III:

As in the case (2) above, the field current is maintained to be constant while the armature current is variable. Since the torque command $T_s$ is negative, however, the field current is also negative in polarity.

(4) When the torque command $T_s$ belongs to the operation section IV or V:

The apparatus is so designed that this phenomenon is impossible as far as the speed control circuit operates normally. Should this section be entered, an upper limit is set for the armature current command $I_{as}$ to prevent any excess armature current which is determental to the motor and the thyristor converters.

By changing the operation sections continuously, it is possible to control the motor torque T rectilinearly.

Figure 5:
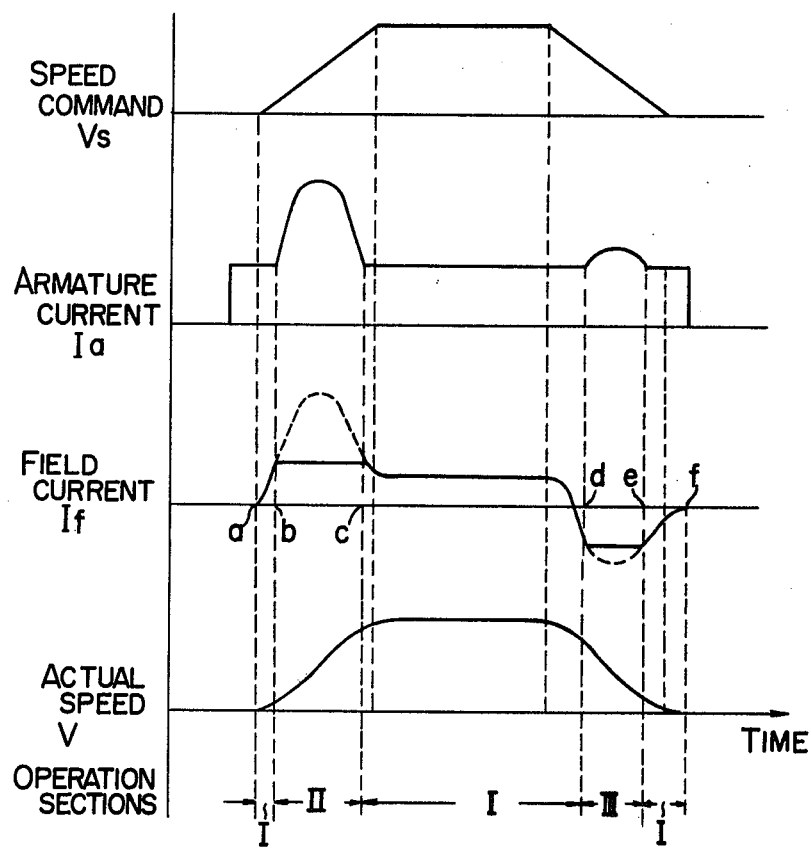
FIG. 5 is a time chart showing an example of operation.

As an example, explanation will be made of the field current $I_f$, the armature $I_a$, the actual speed V and the operation sections with reference to the case where a trapezoidal speed command $V_s$ as shown in FIG. 5 is applied as an input.

The speed command $V_s$ begins to be applied at point $a$ and the field current reaches a limit value at point $b$. In the meantime, the field current increases in proportion to the input voltage. On the other hand, the armature current is controlled fixed substantially at its rated value, so that the operation section I in FIG. 4 is involved.

From point $b$ to $c$, the field current is controlled at the limit value so that the additional torque required for acceleration is supplied by the increase in the armature current. In this way, the operation section II is effective in this case.

At point $c$, the section of large acceleration torque ends and a steady run is entered. The field current undergoes changes in response to the input voltage again with the armature current fixed at a constant rating until the point $d$ where the field current reaches the negative limit value. In this case, the operation section I is involved.

From point $d$ to point $e$ where a large deceleration torque is required, the field current is held at the negative limit level, while the armature current increases from the rated value by the amount compensating for the torque shortage. Thus the operation section III is involved.

After point $e$, the amount of the required deceleration torque decreases and the field current begins to change in accordance with the input voltage, while the armature current is restored to the rated fixed value. In other words, the operation section I is regained.

As will be seen from the foregoing description, the control apparatus for the DC motor according to the present invention in which the armature current is caused to flow only in one direction and the field current in both directions, is characterized in that the field current is controlled between positive and negative limit values and that when the torque command exceeds either of the limit values, the armature current is increased by the amount of excess. As a result, in the case where the motor torque varies between positive and negative values, the characteristics of motor torque T with respect to the torque command $T_s$ are excellent in linearity, thus making possible a highly accurate torque control or speed control.

Also, the fact that the armature current is increased by a required amount only for the shortest possible time lowers the increase in motor temperature, thereby preventing damage to the commutator.

The controllability for the operation section I will be now considered. Generally, the field winding of the motor has a large time constant. When a quick control of the motor is required in the operation section I, it is necessary to improve the response of the field current. In view of this, a circuit as shown in FIG. 1 where the field current is detected by the detector 52 and negatively fed back to the phase shifter 46 provides a very effective means not only to improve the response of the control system for the operation of section I but to assure cooperation with the response of the control system for the operation sections II and III.

In this speed control system, motor speed control is possible in accordance with the speed command as far as an error between the speed command $V_s$ and the feedback of the actual speed V is applied by the preamplifier 32 to the function generator 36 as the torque command $T_s$. In application fields requiring a minimized offset error caused by such external disturbances as changes in load torque or motor temperature increases, however, the offset error may be reduced to zero by providing the pre-amplifier 32 with an integrating element as shwon in FIG. 1. In the circuit of FIG. 1, a linear integrator is comprised of an operational amplifier 88, input resistors 90 and 92, a feedback resistor 94, and an integrating capacitor 96 connected in series with the feedback resistor 94, all of which work to produce linear integration characteristics. By the way, reference numeral 98 shows a reset switch opened and closed when the motor starts and stops respectively, which reset switch is used to discharge the capacitor by the amount commensurate with the load torque.

The dynamic characteristics of the quickest possible response to the speed command without any speed overshoot are sometimes required for the speed control system with the pre-amplifier including the integrating element. In order to improve the speed offset compensation and load response characteristics in the transient condition, it is effective to select a small integration time constant which is composed of the resistance of the feedback resistor 94 and the capacitance of the integrating capacitor 96. Since the reduction in the value of the feedback resistor 94 deteriorates the gain of the pre-amplifier 32, however, it is common practice to assure a high stationary gain by minimizing the value of the integrating capacitor 96. In spite of this, the stability of transient response is lost, thereby posing a problem of overshoot. In view of this, explanation will be made below, with reference to FIG. 1, of a circuit device capable of speed offset compensation with quick response both in normal and transient conditions while at the same time maintaining stable transient speed characteristics.

The speed feedback signal V which is the output of the tacho-generator 28 is differentiated by the capacitor 100 and negatively fed back to the preamplifier 32 which includes the integrating element. Numeral 102 shows a resistor for preventing the characteristics of the amplifier 88 from being deteriorated as the high frequency component of the speed differentiation is fed back. According to this construction, the overshoot of the speed response is prevented even if the response is improved by reducing the capacity of the integrating capacitor 96.

In this speed control system, the variation in armature voltage is very large as compared with the generally-employed system in which the torque is controlled by controlling the armature current with the field current held constant. This sharp change in the armature voltage causes an external disturbance in the constant current control system for the armature current for the operation section I in FIG. 4, with the result that the armature current is deviated from a normal or transient command value. The deviation of the armature current from the command value in turn naturally causes the torque deviation from a command value. For this reason, provision of a circuit as described below will be effective in an application requiring specially accurate speed control characteristics.

Figure 6:
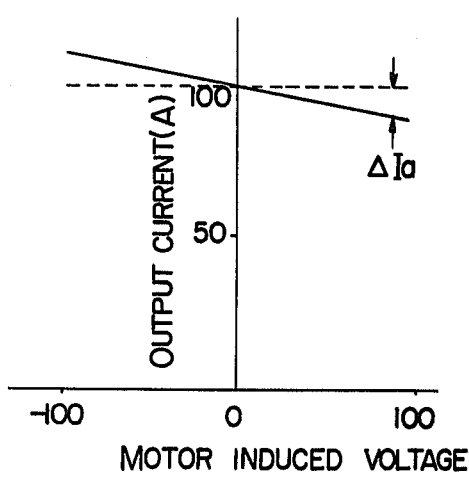
FIG. 6 is a diagram showing the relation between the voltage induced in the motor and the output current.

In the case where the load of the thyristor converter 18 is made up of a pure resistor, constant current characteristics are obtained by providing an armature current negative feedback circuit from the armature current detector 64 to the fourth control winding 62. In the case where such a load as a motor is involved, on the other hand, an induced voltage or like external disturbance reduces the armature current when the induced voltage is positive, while increasing the same when the induced voltage is negative, as shown by the solid line in FIG. 6, unless in addition to the provision of the armature current negative feedback circuit the loop gain is increased considerably. In order to overcome this problem, an output voltage is detected and positively fed back to a fifth control winding 104 of the phase shifter 54 through a resistor 106. By providing such a circuit, the effect of an induced voltage is substantially normally eliminated as shown by the dashed line in FIG. 6.

Figure 7:
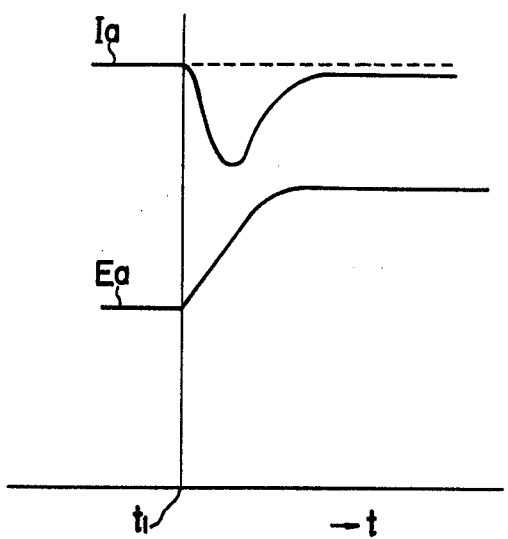
FIG. 7 is a diagram showing the output current characteristics for the transient period of induced voltage generation.

The transient condition attributable to the variation in the motor induced voltage is shown in FIG. 7. When the induced voltage $Ea$ undergoes a change as shown, the armature current $Ia$ also changes transiently as shown by the solid line. In order to effect a forecast control against the variation in the induced voltage, a voltage differentiation value is produced by a capacitor 108 and a resistor 110 and positively fed back to the control winding 104 of the phase shifter 54. It is thus possible to substantially eliminate the transient effect of the induced voltage as shown by the dashed line in FIG. 7.

Figure 4:
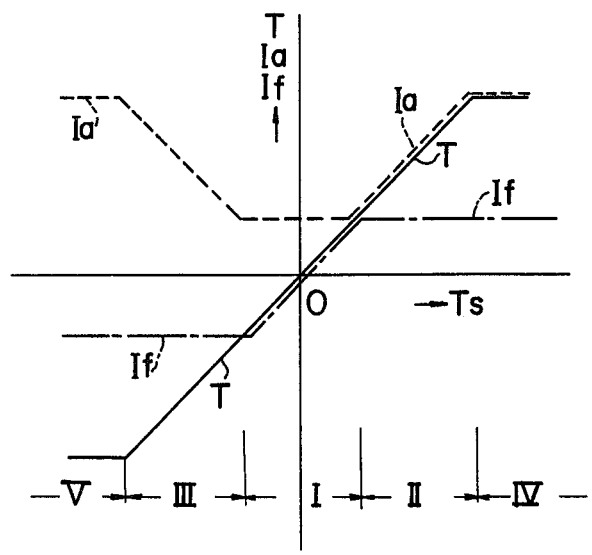
FIG. 4 is a diagram showing various characteristics of a DC motor with respect to the torque command.

A circuit for effectively improving the constant current characteristics of the armature current in the operation section I in FIG. 4 was explained above.

Figure 8:
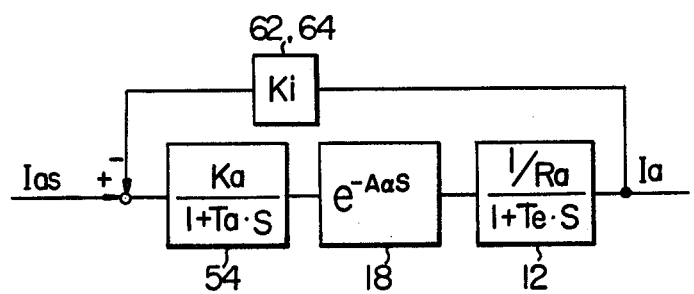
FIG. 8 is a block diagram showing an armature current control system.
Figure 9:
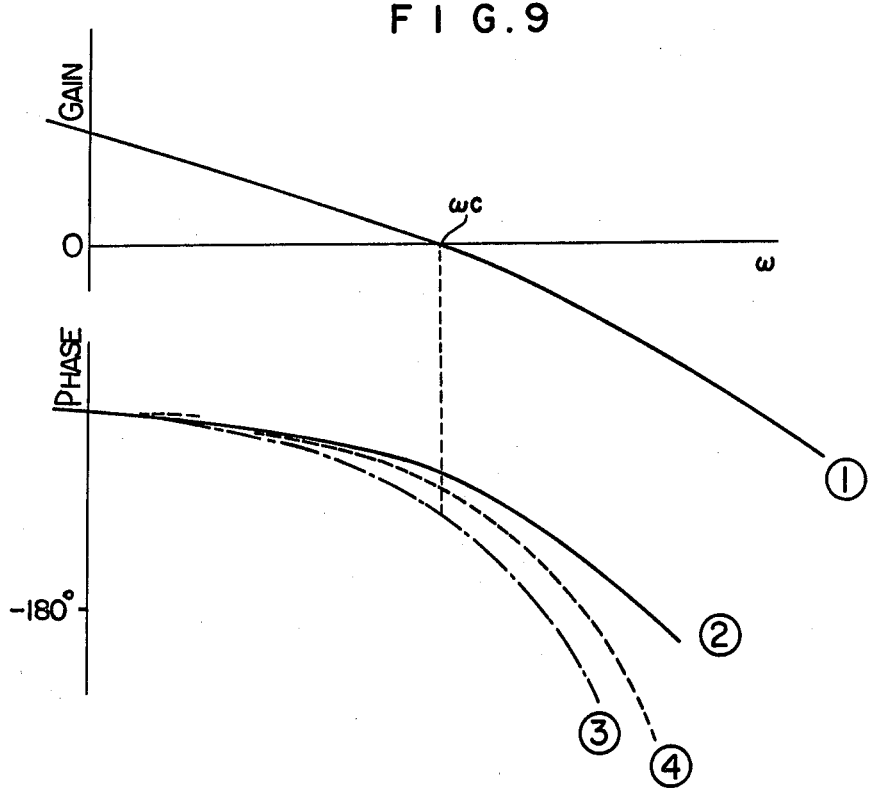
FIG. 9 is a Bode diagram for the armature current control system.

The armature current control system used when an operating point is included in the operation section II or III in FIG. 4 will be now explained. A block diagram of this armature current control system covering the armature current command $I_{as}$ to the armature current $I_a$ is shown in FIG. 8. The armature current command $I_{as}$ is applied to the phase shifter 54 with the time constant Ta and the gain Ka. A voltage is produced by the thyristor converter 18 including a dead time element concerning the control delay angle $\alpha$ and applied to the armature 12 with the time constant $T_e$ and the resistance $R_a$, thereby causing an armature current $I_a$. This armature current $I_a$ is negatively fed back to the phase shifter 54 by the feedback systems 62 and 64 with the gain Ki. A Bode diagram relating to the loop transfer function of this armature current control system is shown in FIG. 9. In the drawing, numeral 1 shows gain curve, numeral 2 a phase curve involving the control delay angle 30° of the thyristor converter 18, and numeral 3 a phase curve involving the control delay angle $\alpha$ of 120°. As will be seen from this diagram, with the increase in the control delay angle $\alpha$ of the thyristor converter 18, the phase in the neighborhood of the intersecting angular frequency $\omega_c$ has less margin of delay, thereby deteriorating the stability of the armature current control system. It is for the operation section III of FIG. 4 that the control delay angle $\alpha$ is increased. And if the stability of the armature current control system for this section is to be assured, an effective means is to provide a loop in which the differentiation value of the armature current is detected by a differentiation transformer 112 and negatively fed back to a fifth control winding 114 of the phase shifter 54 as shown in FIG. 1. The provision of this circuit permits the phase curve 3 to be corrected to the phase curve 4 as shown in FIG. 9, thereby providing a larger phase margin. In this way, even in the state where the control delay angle $\alpha$ increases, the stability of the armature current control system may be assured. Although the embodiment under consideration employs a differentiation transformer for obtaining a differentiation of the armature current, it may be obtained with equal effect by the use of a resistor and a capacitor including a detecting resistor or DC current transformer for detecting the armature current.

In the foregoing embodiments the control element is different within and outside the limit values of field current, so that the gain of the motor torque generated in response to the torque command tends to change. To prevent this inconvenience, the gain of the armature current control system is preferably adjusted by the variable resistors 84 and 86 shown in FIG. 1. At least a gain-adjusting element should be provided either in the field current control system or the armature current control system.

Figure 10:
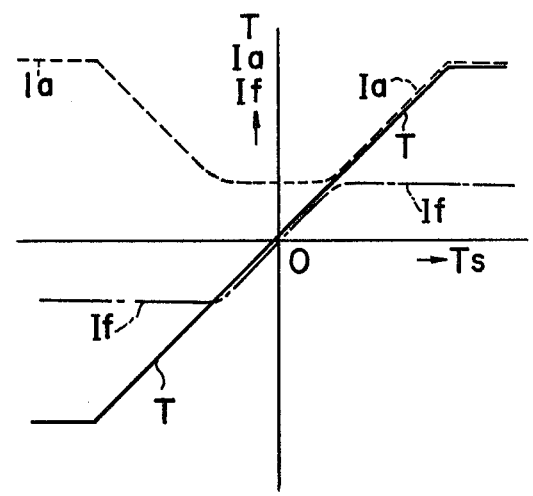
FIG. 10 is a characteristics diagram showing a modification of FIG. 4.

As shown in FIG. 10, the characteristics of the field current $I_f$ may become nonlinear at the changing points due to function generator 36, etc. In such a case, the characteristics of the armature current $I_a$ are made to conform to those of the field current $I_f$ as shown in the drawing, thereby making it possible to hold the linearity of the motor torque T with respect to the torque command $T_s$.

In another preferred embodiment of the invention, the limit value $I_{f0}$ of the field current $I_f$ is set at the rated current, while the lower limit value $I_{as1}$ of the armature current value $I_a$ is minimized as far as the armature current is not interrupted.

Effecting control operation only within the sections without any interruptions of the armature current makes possible accurate speed control without any changes in the response of the speed control system. Further, the firing control of the thyristors in the thyristor converter 18 is facilitated, thereby simplifying the gate circuit therefor.

We claim:

1. An apparatus for controlling a DC motor, comprising a unidirectional converter for permitting a current to flow only in one direction in the armature of said motor, a bilateral converter for allowing a current to flow in opposite directions in the field system of said motor, torque command generator means for generating a torque command for controlling said two converters, first means coupled to said bilateral converter for causing a field current corresponding to the torque command to flow when the torque command is not more than a predetermined value and causing a predetermined field current to flow when the torque command exceeds said predetermined value, and second means coupled to said unidirectional converter for causing a predetermined armature current to flow when the torque command is not more than said predetermined value and causing the armature current to increase, when said torque command exceeds said predetermined value, in accordance with the amount of excess from said predetermined value.

2. An apparatus for controlling a DC motor according to claim 1, in which said torque command generator means includes means for generating a speed command signal, means for generating a signal representing the actual speed of said motor, and a pre-amplifier for amplifying the error between said speed command signal and said signal representing the actual speed of said motor, the output of said pre-amplifier being used as said torque command.

3. An apparatus for controlling a DC motor according to claim 2, in which said pre-amplifier is impressed also with the differentiation of said actual motor speed signal.

4. An apparatus for controlling a DC motor according to claim 2, in which said pre-amplifier includes an integrating element.

5. An apparatus for controlling a DC motor according to claim 1, in which said first means includes a first function generator for converting said torque command into a field current command and first control means for controlling said bilateral converter in accordance with said field current command, and said second means includes a second function generator for converting said torque command into an armature current command and second control means for controlling said unidirectional converter in accordance with said armature current command.

6. An apparatus for controlling a DC motor according to claim 5, in which said first control means constitutes a field current negative feedback control system.

7. An apparatus for controlling a DC motor according to claim 5, in which said second control means constitutes an armature current negative feedback control system.

8. An apparatus for controlling a DC motor according to claim 7, in which said armature current negative feedback control system further includes means for negatively feeding back the differentiation of the armature current.

9. An apparatus for controlling a DC motor according to claim 7, in which said armature current negative feedback control system further includes means for positively feeding back the armature voltage.

10. An apparatus for controlling a DC motor according to claim 9, in which said armature current negative feedback control system further includes means for positively feeding back the differentiation of the armature voltage.

11. An apparatus for controlling DC motor according to claim 5, in which said first function generator includes a limiter circuit for setting positive and negative limits in response to said torque command, and said second function generator includes an absolute value circuit for producing the absolute value of said torque command and an insensitive element for producing, when the output of said absolute value circuit substantially exceeds said limits, an output corresponding to the amount of excess.

12. An apparatus for controlling a DC motor according to claim 5, in which said first function generator has a torque command voltage terminal connected to a positive constant voltage circuit and a negative constant voltage circuit, said function generator causing the excess of said torque command voltage over the positive and negative constant voltages of said constant voltage circuits to be bypassed to said constant voltage circuits, and said second function generator includes means for producing a current bypassed to said constant voltage circuits.

13. An apparatus for controlling a DC motor according to claim 5, in which at least one of said first function generator and said second function generator includes means for adjusting the gain of a current command with respect to said torque gain.

14. An apparatus for controlling a DC motor according to claim 1, in which the magnitude of said constant armature current is set at a value where said armature current is not interrupted.

* * * * *